US 7,555,636 B2

(12) United States Patent
Brenner

(10) Patent No.: US 7,555,636 B2
(45) Date of Patent: *Jun. 30, 2009

(54) ATOMICALLY UPDATING 64 BIT FIELDS IN THE 32 BIT AIX KERNEL

(75) Inventor: Larry Bert Brenner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/846,933

(22) Filed: Aug. 29, 2007

(65) Prior Publication Data
US 2007/0294489 A1 Dec. 20, 2007

Related U.S. Application Data

(63) Continuation of application No. 10/887,439, filed on Jul. 8, 2004, now Pat. No. 7,437,541.

(51) Int. Cl.
G06F 7/38 (2006.01)
(52) U.S. Cl. ...................................... 712/224
(58) Field of Classification Search .................. 712/224
See application file for complete search history.

(56) References Cited

U.S. PATENT DOCUMENTS 5,193,167 A * 3/1993 Sites et al. ................... 711/163
5,933,650 A * 8/1999 van Hook et al. .............. 712/2

* cited by examiner

Primary Examiner—Eddie P Chan
Assistant Examiner—John Lindlof
(74) Attorney, Agent, or Firm—Yee & Associates, P.C.; Diana R. Gerhardt

(57) ABSTRACT

A method, system, and computer instructions for atomically updating 64-bit fields in the 32-bit AIX kernel, wherein the underlying hardware's 64-bit capable instructions are used to construct an atomic primitive. If a data request applies to the 32-bit kernel on 64-bit hardware execution environment, a load and reserve instruction sets a reservation for a memory location. The original 64-bit data object is decomposed into two 32-bit halves. A Shift Right Double Word Immediate (SRDI) instruction captures the high-order bits of the 64-bit register. If the store conditional instruction determines that the reservation is not lost, the store conditional instruction stores the result. If the store conditional instruction fails, the process returns to the reserve instruction until the store conditional operation returns a success.

8 Claims, 4 Drawing Sheets

```
unsigned long long
fetch_and_addLL (unsigned long long *data, unsigned int incr)                    200
{
        union {
                unsigned long long D;      /* the whole doubleword */
                int I[2];                  /* the two individual words of it */
        } *actual, copy;
#define HI I[0]                            /* high-order word */
define LO I[1]                            /* low-order word */ unsigned long long old, new;
        int ipri;
        unsigned long long acct_fetch_and_addll (long long *, int) ; /*XXX - unsigned? */

202 { #ifdef __64BIT_KERNEL  ~204
        old = fetch_and_addlp ((long *) data, incr) ; ~206
      #else  /* __64BIT_KERNEL */

230 { #ifdef _POWER_MP
        if (__power_64()) { ~232
                old = acct_fetch_and_addll (data, incr) ; ~234

220 ~} else {
              ipri = i_disable (INTMAX) ;
              actual = (void *) data;        /* point to doubleword as 2 ints */

222 ~while (!test_and_set(&actual->HI, INT_MIN))   /* interlock */
              ;
              isync() ;              /* don't prefetch w/o interlock */

/* We increment the locked doubleword in local memory,
               * because we must not accidentally reset the interlock bit
               * before guaranteeing that the low-order word has reached
218 {          * physical memory. Then the high-order word can be
               * stored, simultaneously releasing the interlock.
               */
              old = actual->D;              /* save locked old value for return */
              new = old;                    /* copy the original value */
      224 ~ new += incr;       /* add incr our copy */
              new &= LONGLONG_MAX;          /* reset copy's interlock bit */
              copy.D = new;                 /* prepare to decompose the result */
      226 ~ actual->LO = copy.LO;           /* store low-order word first */
              LWSYNC() ;                    /* wait for it! */
      228 ~ actual->HI = copy.HI;           /* high-order resets interlock */
              old &= LONGLONG_MAX;          /* don't return with interlock bit */
              i_enable(ipri) ;
        }
      #else  /* _POWER_MP */ ~210
              ipri = i_disable(INTMAX) ; ~212
208 {         old = *data; ~214
              *data += incr; ~214
              i_enable(ipri) ; ~216
      #endif /* _POWER_MP */
      #endif /* __64BIT_KERNEL */ return old;
```

FIG. 2

```
#**********************************************************************
#   NAME:   acct_fetch_and_addll

#   FUNCTION:   perform a 64bit fetch and add using 64bit instructions
#               under the 32bit kernel.
ulonglong acct_fetch_and_addll(ulonglong *data, uint incr)

#   INPUT STATE:
#       r3 = ptr to the atomic location, a doubleword
#       r4 = integer value to be added

#   OUTPUT STATE:
#       r3, r4 = longlong original value (before the add)

#   EXECUTION ENVIRONMENT:
#       can be called from the process environment.   It may page fault.
#       THIS ROUTINE IS NOT MACHINE INDEPENDENT.   IT IS FOR USE *ONLY*
#       BY ADVANCED ACCOUNTING UNDER THE 32BIT KERNEL ON 64BIT HARDWARE.

#   NOTES:
#       If this code is interrupted, the 32bit kernel contex save and
#       restore will clear the high-order word of its registers.
#       However, AIX guarantees that we will lose the ldarx storage
#       reservation whenever this happens, so we'll automatically retry.

#       Since we are running in 32bit mode, we can not be sure what is
#       in the high-order half of registers passed to us.
#       Similarly, we needn't worry about the high-order half of our
#       return registers.

#**********************************************************************
KERNEL_32_MP('
        .machine "push"
        .machine "ppc64"

S_PROLOG(acct_fetch_and_addll)

ifdef('DEBUG', '
        rlwinm      r5, r3, 0, 7
        twnei  r5, 0                # data not doubleword aligned mr     r6, r3               # copy data pointer
        clrldi      r7, r4, 32      # clean leftmost 32 bits of incr retry_add:
        ldarx  r4, 0, r6     ——302  # original data doubleword
304 ——  add    r5, r4, r7           # add incr
        srdi   r3, r4, 32 ——306     # capture original high-order word
308 ——  stdcx.      r5, 0, r6       # conditionally store updated value
        bne-   cr0, retry_add       # retry if lost our reservation br                          # return, old data in r3 r4.
        FCNDES(acct_fetch_and_addll)
                                                                300 machine "pop"
```

FIG. 3

ATOMICALLY UPDATING 64 BIT FIELDS IN THE 32 BIT AIX KERNEL

This application is a continuation of application Ser. No. 10/887,439, filed Jul. 8, 2004, now U.S. Pat. No. 7,437,541.

BACKGROUND OF THE INVENTION

1. Technical Field

The present invention relates generally to an improved data processing system. In particular, the present invention relates to a method, apparatus, and computer instructions for atomically updating 64-bit fields in the 32-bit AIX kernel.

2. Description of Related Art

The UNIX operating system is a multi-user operating system supporting a hierarchical directory structure for the organization and maintenance of files. In contrast with a single operating system, UNIX is a class of similar operating systems. There are dozens of different implementations of UNIX, such as Advanced Interactive executive (AIX), a version of UNIX produced by International Business Machines Corporation. Each implementation is similar to use because each provides a core set of basic UNIX commands.

The UNIX operating system is organized at three levels: the kernel, shell, and utilities. The kernel is the software that manages a user program's access to the system hardware and software resources, such as scheduling tasks, managing data/file access and storage, and enforcing security mechanisms. The shell presents each user with a prompt, interprets commands typed by a user, executes user commands, and supports a custom environment for each user. The utilities provide tools and applications that offer additional functionality to the operating system.

In the AIX operating system, kernel atomic operations comprise reserve and conditional store instructions for reading and writing to a shared location. Reservation instructions and partnering conditional store instructions are often referred to as load and reserve indexed (LARX) instructions and store conditional indexed (STCX) instructions. In particular, a LARX instruction first creates a reservation for a memory location for use by a partnered STCX instruction. The STCX instruction is subsequently executed if the reservation has remained valid. In other words, if the reservation is lost, the conditional store in the STCX operation will not be performed. The reservation set by the LARX instruction may be lost if the memory location has been modified by the CPU, another CPU, or another device prior to the execution of the partnered STCX instruction. In this situation, rather than perform the conditional store instruction, the STCX will set the zero bit in the status register. A bne branch instruction, which tests this bit, will branch backwards to retry the atomic operation again. In this manner, the Atomicity code keeps refetching and conditionally writing until it determines that the memory location has not been modified between the execution of the LARX and STCX instructions.

In addition, a reservation may also be lost whenever an interrupt occurs in the AIX operating system. When an interrupt occurs, the AIX kernel always uses a LARX/STCX operation to process the interrupt. However, as a side effect of the interrupt, the interrupted program's LARX reservation will be lost. This reservation will be lost even though the LARX/STCX used while processing the interrupt is not storing into the memory location reserved by the first LARX reservation.

Kernel atomic operations allow for operating on objects that are no larger than the CPU's natural word size. A CPU's word size is the number of bits that the CPU can process at one time. For example, a CPU with a 64-bit word size can manipulate 64 bits at a time. Although atomic operations are available for maintaining 64 bit quantities under the 64-bit kernel, a problem with maintaining a 64-bit object in the 32-bit kernel when 64-bit hardware is available is that the high-order 32 bits of a 64-bit register may be lost if an interrupt occurs. The high-order bits may be lost because the 32-bit kernel does not know these high-order bits are there to preserve. Thus, since the 32-bit kernel will not know to protect the high-order bits of the 64-bit register, the 64-bit quantities in the machine registers will be silently truncated to 32-bits if an interrupt occurs.

Existing methods of maintaining a 64-bit object in the 32-bit kernel contain several disadvantages. One method utilizes locks to control access to the data object. A lock is a mechanism that controls access to a resource in an environment where there are many threads of execution. While a lock may be used to enforce concurrency control policies, this method requires that the lock must be explicitly locked and unlocked around the code which updates or accesses the object. Another method uses disablement to provide serialization. Interrupts are disabled and re-enabled around the code which updates or accesses the object. However, these approaches are problematic since they add both space and time overhead to the programs.

Given that the AIX operating system always uses a LARX instruction while processing interrupts, it would be advantageous to have a mechanism in the AIX operating system for detecting potentially damaging interruptions (which cause reservations set by the LARX instruction to be lost) without incurring any additional cost. It would further be advantageous to have a mechanism in the AIX operating system for atomically updating 64-bit fields in the 32-bit kernel by protecting the high-order 32-bits of a 64-bit register if an interrupt occurs.

SUMMARY OF THE INVENTION

The present invention provides a method, system, and computer instructions for atomically updating 64-bit fields in the AIX 32-bit kernel, wherein the underlying hardware's 64-bit capable instructions are used to construct an atomic primitive. The present invention builds upon existing atomic operations to provide a mechanism for constructing an atomic primitive for use in the 32-bit kernel in a manner similar to the process in the inherently more convenient environment of the 64-bit kernel, but without the overhead and problems associated with utilizing locks. The present invention recognizes that, when an interrupt occurs, the AIX kernel always uses a LARX/STCX operation while processing the interrupt. As the AIX operating system always uses a LARX instruction to process an interrupt, the present invention allows for detecting potentially damaging interruptions that cause 64-bit context to be lost, without incurring any additional cost. Since this AIX kernel behavior guarantees loss of the LARX reservation to an interrupted program, the program does not need to disable the interrupt or otherwise explicitly attempt to detect that the program has been interrupted.

In addition, the present invention allows for atomically updating 64-bit fields in the 32-bit kernel by protecting the high-order 32-bits of a 64-bit register. The present invention creates an atomic primitive, using Load Double Word Reserve Indexed (LDARX) and Store Double Word Conditional Indexed (STDCX) instructions, that is functionally equivalent to a lock. As an interrupt handled by AIX will indirectly cause the LDARX reservation (the basis of an atomic operation) to be lost, the mechanism of the present invention, in the code path between the LARX and the STCX instructions, provides for packing of "long long" (64-bit integers) from register pairs passed as inputs, and then unpacking a result from a 64 bit register into a register pair to be returned as the function value. Thus, each 32-bit half of the 64-bit object is placed in a protected side of a register. The high order bits of the 64-bit registers are preserved in order to be able to return the original value of the 64-bit object as it was prior to it being atomically incremented. In this manner, the high-order 32-bits of a 64-bit register are protected if an interrupt occurs.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is an example process for determining the subcase of atomic operation to use in the execution environment in accordance with the present invention;

FIG. 3 is an example operation illustrating a 64-bit fetch and add operation using 64-bit instructions under the 32-bit kernel in accordance with the present invention.

DETAILED DESCRIPTION OF THE PREFERRED EMBODIMENT

Figure 1:
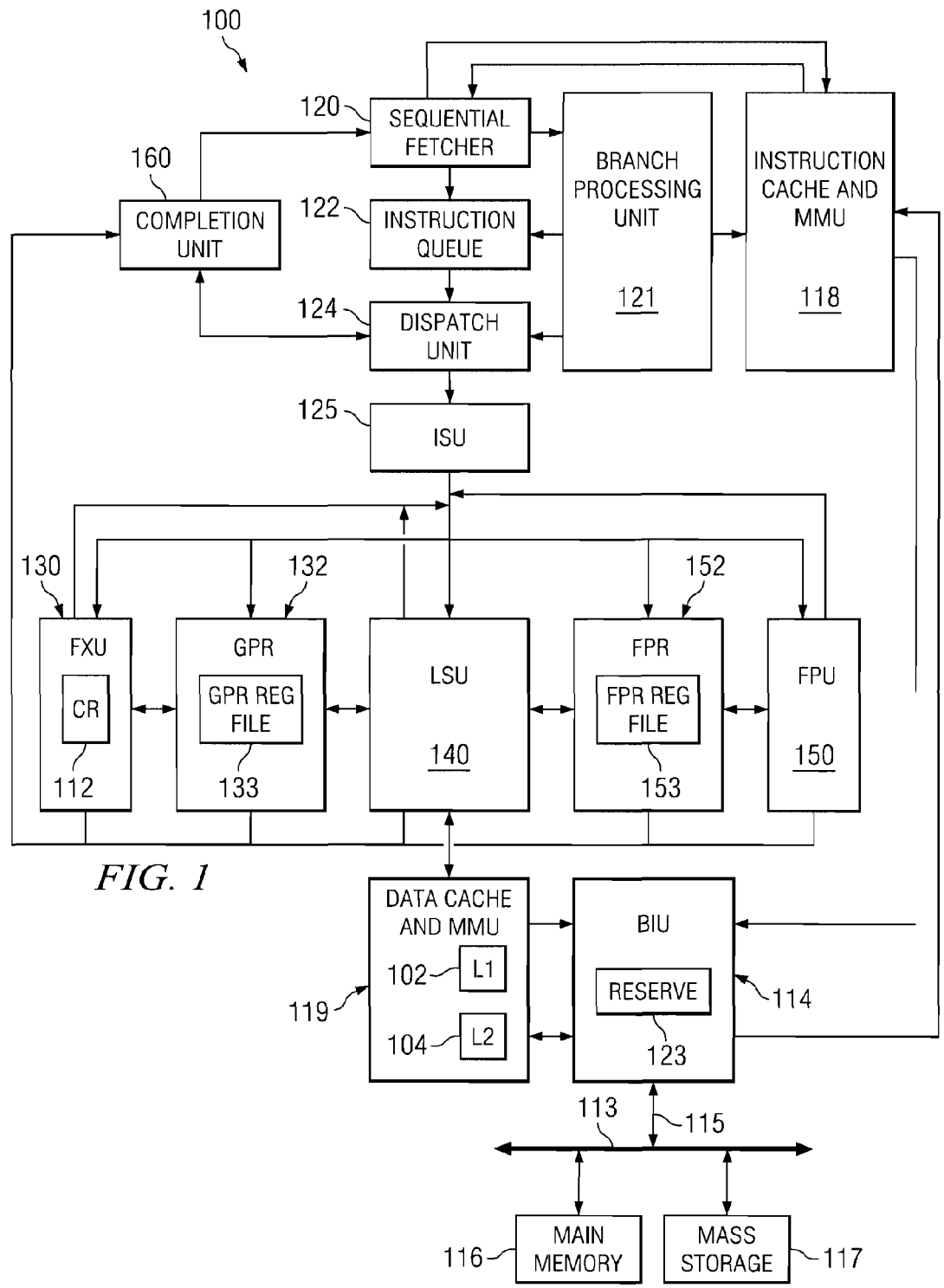
FIG. 1 is a block diagram of a superscalar data processing system in which the present invention may be implemented.

The present invention provides a method, apparatus and computer program product for atomically updating 64-bit fields in the 32-bit kernel. The following FIG. 1 is provided as an exemplary diagram of a data processing environment in which the present invention may be implemented. It should be appreciated that FIG. 1 is only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a block diagram of a superscalar data processing system in which the present invention may be implemented. Data processing system 100 may be a PowerPC RISC processor, wherein in the PowerPC RISC processor instruction set, LARX and STCX instructions are further designated as load word and reserve indexed (LWARX) and store word conditional indexed (STWCX) instructions. Other processors with other instruction sets may implement similar instructions such as LARX and STCX instructions or other instructions which provide for atomic memory accesses to memory from multiple processors while maintaining memory coherence.

In the illustrative embodiment shown in FIG. 1, data processing system 100 comprises a single integrated circuit superscalar microprocessor. Accordingly, processor 100 includes various execution units, registers, buffers, memory devices, and other functional units, which are all formed by integrated circuitry. Although the invention is described herein as applied to a microprocessor, the present instruction handling scheme is not limited to microprocessors and may be implemented in other types of processors.

Data processing system 100 includes issue unit (ISU) 125 which will be described in detail below. ISU 125 gives execution units 130, 140, and 150 the ability to reject instructions. Rejected instructions remain in ISU 125 to be reissued at a later time.

As illustrated in FIG. 1, data processing system 100 is coupled to system bus 113 via bus interface unit (BIU) 114 and processor bus 115. Both system bus 113 and processor bus 115 include address, data, and control buses which are not shown separately. BIU 114 participates in bus arbitration to control the transfer of information between data processing system 100 and other devices coupled to system bus 113, such as main memory 116 and non-volatile mass storage 117. Processor 100 preferably includes other devices coupled to system bus 113; however, these other devices are not necessary for an understanding of the invention and are accordingly omitted from the drawings so as not to obscure the invention in unnecessary detail.

In addition, BIU 114 includes a reserve register 123 which establishes a valid reservation for a particular data address. Typically, a LARX instruction will place a reservation in reserve register 123 for a particular data address. A valid reservation in reserve register 123 will be lost if any intervening remote store to the reservation address occurs on system bus 113. A remote store is the result of other processors or input/output (I/O) devices referencing the address established by the LARX instruction, prior to the STCX instruction which references the address.

BIU 114 is connected to instruction cache and MMU (memory management unit) 118 and data cache and MMU 119. High-speed caches, such as level one (L1) cache 102 and level two (L2) cache 104, within data cache and MMU 119, enable data processing system 100 to achieve relatively fast access times to a subset of data or instructions previously transferred from main memory 116 to the caches, thus improving the overall processing speed. Data and instructions stored within the data cache 119 and instruction cache 118, respectively, are each identified and accessed by an effective address, which is related to the real address of the respective data or instructions in main memory 116.

Instruction cache and MMU 118 is further coupled to sequential fetcher 120, which fetches instructions for execution from instruction cache and MMU 118 during each processor cycle. Sequential fetcher 120 transmits branch instructions fetched from instruction cache and MMU 118 to branch processing unit (BPU) 121 for execution, and temporarily stores sequential instructions within instruction queue 122 for eventual transfer to dispatch unit 124 for decoding and dispatch to instruction issue unit (ISU) 125.

In the depicted illustrative embodiment, in addition to BPU 121, the execution circuitry of data processing system 100 comprises multiple execution units for executing sequential instructions, including fixed-point unit (FXU) 130, load-store unit (LSU) 140, and floating-point unit (FPU) 150. Each execution unit 130, 140, and 150 typically executes one or more instructions of a particular type during each processor cycle.

FXU 130 performs fixed-point mathematical and logical operations such as addition, subtraction, ANDing, ORing, and XORing, utilizing source operands received from specified general purpose registers (GPRs) 132. Following the execution of a fixed point instruction, FXU 130 outputs the data results of the instruction on result bus 128 to a GPR register file 133 associated with GPRs 132. Further, a condition register (CR) 112 within FXU 130 maintains the control bits which indicate the condition of instructions within GPRs 132.

FPU 150 typically performs single and double precision floating-point mathematical and logical operations, such as floating-point multiplication and division, on source operands received from floating-point registers (FPRs) 152. FPU 150 outputs data resulting from the execution of floating-point instructions on result bus 128 to a FPR register file 153, which temporarily stores the result data.

LSU 140 typically executes floating-point and fixed-point instructions which either load data from memory or which store data to memory. For example, an LSU instruction may load data from either the data cache and MMU 119 or main memory 116 into selected GPRs 132 or FPRs 152. Other LSU instructions may store data from a selected GPR 132 or FPR 152 to main memory 116. For example, a LARX instruction may cause a data load into selected GPRs 132 when executed. Further, a STCX instruction may store data from a selected GPR 132 to main memory 116 if enabled by a proper reservation.

In contrast with existing atomic primitives, the present invention places any instructions that depend on a 64-bit value in a register within the LDARX/STDCX loop. For example, in a fetch_and_add atomic operation, the goal is to return the original value of the 64-bit object as it was before it was atomically incremented. To perform this task in the 32-bit kernel, the original 64-bit object is decomposed into two 32-bit halves within the LDARX/STDCX loop. This is done in preparation for returning the original value under the protection of the LDARX/STDCX loop. To facilitate this process, a Shift Right Double Word Immediate (SRDI) instruction is inserted between the LDARX and STDCX instructions. The SRDI instruction is included to shift the contents of the register right by the number of bits specified by the immediate value. In other words, the SRDI instruction captures the original high-order 32 bits of the 64-bit register and protects it by placing it in the low-order 32 bits of another register. In this manner, the high order bits of the 64-bit registers are preserved in order to be able to return the original value of the 64-bit object as it was prior to it being atomically incremented. Thus, each 32-bit half of the 64-bit object is placed in a protected side of a register. The example atomic service adds a 32 bit value atomically to a 64 bit value. If the increment being added were required to be a 64-bit quantity, the two halves passed in two registers in the 32-bit kernel environment would need to be assembled into a single 64-bit register, again within the LDARX/STDCX loop. As a result, when the interrupt occurs, the high-order 32 bits of the 64-bit object will be reconstructed.

Turning now to FIG. 2, an example operation for determining the subcase of atomic operation to use in the execution environment in accordance with a preferred embodiment of the present invention is shown. In this illustrative example, the program shown in FIG. 2 is implemented within an AIX kernel in a data processing system, such as data processing system 100 in FIG. 1.

In this illustrative example, program 200 is used to identify the particular subcase in a family of atomic operations defined in the AIX kernel. For example, subcases of atomic operation include:

(1) 64-bit kernel multi-processor (MP) kernel (2) 32-bit uni-processor (UP) kernel (only supported on 32-bit hardware)

(3) 32-bit multi-processor (MP) kernel on 32-bit hardware (4) 32-bit multi-processor (MP) kernel on 64-bit hardware The first subcase of atomic operation is the 64-bit multi-processor (MP) kernel. With this subcase, existing callable services in the 64-bit kernel may be used to update 64-bit fields in the 64-bit kernel. Conditional statement 202 shows that if program 200 identifies that the data request applies to the 64-bit MP kernel 204 execution environment, an existing subroutine, such as the fetch_and_addlp service 206, is called.

The second subcase of atomic operation is the 32-bit uni-processor (UP) kernel. As the UP kernel has a single processor, serialization may be provided by disabling interrupts. Conditional statement 208 shows that if program 200 identifies that the data request applies to the 32-bit UP kernel 210 execution environment, interrupts are disabled 212. Once the doubleword is incremented 214, interrupts are re-enabled 216.

The third subcase of atomic operation is the 32-bit multi-processor (MP) kernel on 32-bit hardware. In this subcase, the high-order bit of the 64-bit object is reserved for use as an internal lock (i.e., interlock bit). Using the internal lock allows for avoiding the use of more expensive external locks and locking services. Conditional statement 218 shows that if program 200 identifies that the data request applies to the 32-bit MP kernel 220 execution environment, the doubleword is locked 222 and incremented in local memory 224. After the low order word is stored 226, the high order word is stored 228, which releases the lock as well.

The fourth subcase of atomic operation is the 32-bit kernel on 64-bit hardware. This subcase is of particular interest to the present invention, as the underlying hardware's 64-bit capable instructions may be used to carefully construct an atomic primitive for maintaining a 64-bit object under the 32-bit AIX kernel without incurring any additional cost. Conditional statement 230 shows that if program 200 identifies that the data request applies to the 32-bit MP kernel on 64-bit hardware 232 execution environment, a subroutine for performing an atomic primitive using 64-bit instructions under the 32-bit kernel, such as acct_fetch_and_addll service 234 is called. Acct_fetch_and_addll service 234 is described in detail below.

FIG. 3 is an example atomic operation illustrating a 64-bit fetch and add operation in accordance with a preferred embodiment of the present invention. This atomic operation allows for detecting whether the reservation has been lost due to an interrupt. This operation also allows a 64-bit field in the 32-bit kernel to be atomically updated by branching back and reloading the high-order 32-bits of the 64-bit register in case an interrupt occurs.

This atomic operation may be called when program 200 in FIG. 2 identifies that the data request applies to the 32-bit MP kernel on 64-bit hardware 232 execution environment. In this illustrative example, the operation shown in FIG. 3 is implemented within an AIX kernel in a data processing system, such as data processing system 100 in FIG. 1. The AIX operating system is used in this example since it always uses a LARX instruction while processing interrupts.

In the illustrative example in FIG. 3, a subroutine for advanced accounting is shown. Acct_fetch_and_addll subroutine 300 performs a 64-bit fetch and add instruction using 64-bit instructions under the 32-bit kernel. Acct_fetch_and_addll subroutine 300 may be called from the process environment and may page fault. Acct_fetch_and_addll subroutine 300 is not machine independent. It should be noted that although a fetch_and_add operation is shown in FIG. 3, other atomic operations, such as a fetch_and_zero operation, may be constructed similarly as an atomic primitive with LDARX and STDCX in the same manner.

When acct_fetch_and_addll subroutine 300 is called, a load and reserve instruction, such as load double word reserve indexed (LDARX) instruction 302, sets a reservation bit internal to the processor. The reservation logic maintains a reservation flag per processor to indicate when a reservation is set. The flag may be set when a LDARX instruction is received from the processor. The reservation is associated with the location and the processor.

In addition, the original 64-bit object is decomposed as loaded with LDARX into two 32-bit halves. This step is done in preparation for returning the original value, under the protection of the LDARX/STDCX loop. After an increment step is performed (e.g., add 304), a Shift Right Double Word Immediate (SRDI) instruction 306, placed within the LDARX and STDCX loop, is performed. The SRDI instruction is included to shift the contents of the register right by the number of bits specified by the immediate value. In other words, the SRDI instruction captures the original high-order word and places it in another register's low-order (protected) word. In this manner, the high-order 32-bits of the 64-bit register are preserved in order to be able to return the original value of the 64-bit object as it was prior to it being atomically incremented. If the increment being added needs to also be a 64-bit quantity, the two halves passed in two registers in the 32-bit kernel environment would need to be assembled into a single 64-bit register, again within the LDARX/STDCX loop.

Next, a store conditional instruction, such as store double word conditional indexed (STDCX) instruction 308, checks the reservation and determines if the reservation has remained valid. If the reservation is valid, STDCX writes the new value to the location. In this manner, the high-order 32-bits of a 64-bit register will be preserved if an interrupt occurs.

Figure 4:
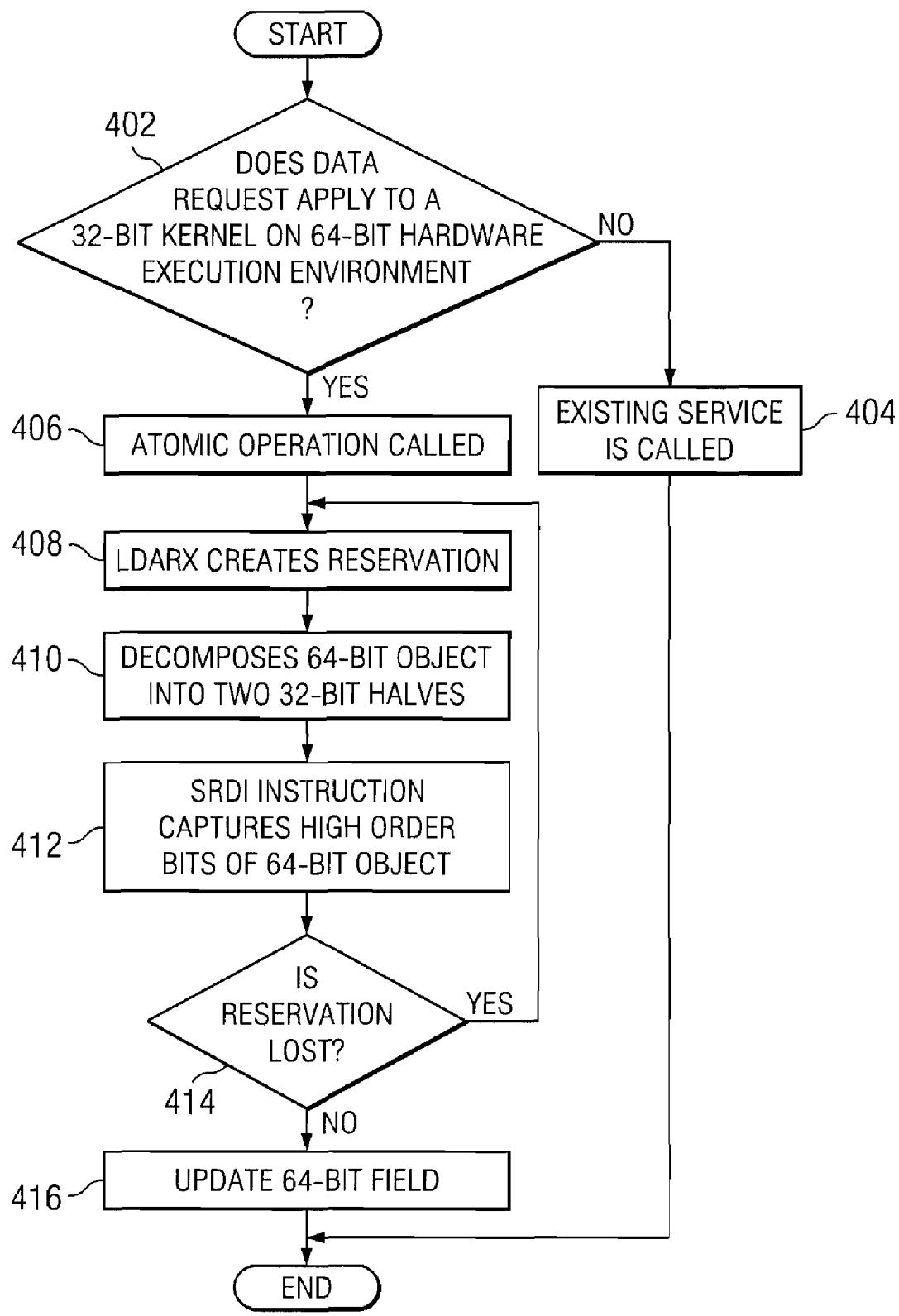
FIG. 4 is a flowchart of a process for updating 64-bit quantities in the 32-bit kernel in accordance with a preferred embodiment of the present invention.

FIG. 4 is a flowchart of a process for updating 64-bit quantities in the 32-bit kernel in accordance with a preferred embodiment of the present invention. The process illustrated in FIG. 4 may be implemented within an AIX kernel in a data processing system, such as data processing system 100 in FIG. 1. In this illustrative example, an atomic primitive is used to atomically update 64-bit fields in the 32-bit kernel by protecting the high-order 32-bits of a 64-bit register in case an interrupt occurs.

The process begins with determining if a data request applies to the 32-bit MP kernel on 64-bit hardware execution environment (step 402). If not, an existing service is called (step 404).

If the data request applies to the 32-bit MP kernel on 64-bit hardware execution environment, an atomic operation using 64-bit instructions under the 32-bit kernel is called (step 406). Within the atomic operation, a load and reserve instruction, such as LDARX, sets a reservation for a memory location (step 408). Next, the original 64-bit object is decomposed into two 32-bit halves (step 410). This is done in preparation for returning the original value, under the protection of the LDARX/STDCX loop. An SRDI instruction is performed to shift the contents of the register right by the number of bits specified by the immediate value (step 412). In this manner, the high-order 32-bits of the 64-bit register are preserved in order to be able to return the original value of the 64-bit object as it was prior to it being atomically incremented.

Next, a store conditional instruction, such as STDCX, checks the reservation and determines if the reservation has remained valid (step 414). If the reservation has not been lost, the store conditional instruction stores the result (step 416). If the store conditional instruction fails (e.g., an interrupt occurs and the reservation is lost), the process returns to step 408 until the store conditional operation returns a success. If the store conditional succeeds, the original 64 bit value is already decomposed into the necessary pair of registers required when a subroutine must return a 64 bit value in a 32 bit environment.

Thus, the present invention provides a method, apparatus, and computer instructions for constructing an atomic primitive for use in the 32-bit kernel in a manner similar to the process in the inherently more convenient environment of the 64-bit kernel. The present invention provides an advantage over current systems by using the AIX operating system's feature of using LARX instructions for processing interrupts to detect potentially damaging interruptions that cause the data in the high-order halves of all registers to be lost, without incurring any additional cost. The present invention creates an atomic primitive that is functionally equivalent to a lock using load double word reserve indexed (LDARX) and store double word conditional indexed (STDCX) instructions, without the expense. Like the existing primitives of the 64-bit kernel, the present invention is effective on pageable data. In this manner, the mechanism of the present invention allows for creating a callable service that may be used in kernel code without concern for the specific kernel or hardware environment.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the present invention is described in terms of updating a 64-bit field in a 32-bit environment, the present invention may also be applicable to other environments, wherein the underlying hardware word size exceeds that supported by the execution environment (e.g., updating 32-bit field in a 16-bit environment, updating 128-bit field in a 64-bit environment, etc.). The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for atomically updating a first bit field in a second bit environment, wherein the first bit field word size exceeds the word size supported by the second bit environment, the method comprising:

executing a load and reserve indexed instruction in response to a determination that a data request applies to a first bit object in a second bit execution environment, wherein the load and reserve indexed instruction creates a reservation for a memory location;

decomposing the first bit object into low-order bits and high-order bits;

preserving the low-order bits in a low-order word in a first register;

preserving the high-order bits in a low-order word in a second register, wherein the high-order bits are preserved to allow for returning the original value of the first bit object in the second bit execution environment when the reservation is lost;

executing a store conditional indexed instruction, wherein the store conditional indexed instruction stores a result to the memory location if the reservation has remained valid; and reconstructing the first bit object with the low-order bits and the high-order bits if the reservation is lost.

2. The method of claim 1, wherein the processing unit further executes the computer usable code to branch back to the load and reserve indexed instruction if the store conditional instruction is not performed.

3. The method of claim 1, wherein the load and reserve indexed instruction is a load and reserve doubleword indexed instruction.

4. The method of claim 1, wherein the store conditional indexed instruction is a store conditional doubleword indexed instruction.

5. The method of claim 1, wherein decomposing the first bit object, preserving the low-order bits, and preserving the high-order bits is performed using a shift right doubleword immediate instruction.

6. The method of claim 1, wherein the high-order bits are preserved under the protection of a load and reserve indexed/store conditional indexed loop.

7. The method of claim 1, wherein the low-order bits are preserved in the low-order word of the first register and the high-order bits are preserved in the low-order word of the second register.

8. The method of claim 1, wherein the second bit environment is a 32-bit Advanced Interactive eXecutive kernel, and wherein the Advanced Interactive eXecutive kernel executes a load and reserve indexed instruction while processing an interrupt.

* * * * *